April 19, 1938. L. L. CUNNINGHAM ET AL 2,114,704
MULTIPLE ELECTRICAL PROPORTIONING SYSTEM
Filed July 25, 1935 2 Sheets-Sheet 1

Inventor
Lewis L Cunningham
Clarence W. Nessell
By George H Fisher
Attorney

April 19, 1938. L. L. CUNNINGHAM ET AL 2,114,704
MULTIPLE ELECTRICAL PROPORTIONING SYSTEM
Filed July 25, 1935 2 Sheets-Sheet 2

Fig. 3

Inventors
Lewis L. Cunningham
Clarence W. Nessell
By George H. Fisher
Attorney

Patented Apr. 19, 1938

2,114,704

UNITED STATES PATENT OFFICE 2,114,704

MULTIPLE ELECTRICAL PROPORTIONING SYSTEM

Lewis L. Cunningham, Minneapolis, Minn., and Clarence W. Nessell, Forest Park, Ill., assignors to Minneapolis-Honeywell Regulator Company, Minneapolis, Minn., a corporation of Delaware Application July 25, 1935, Serial No. 33,070

14 Claims. (Cl. 172—239)

The present invention relates to an electrical proportioning or follow-up system of the electrical follow-up type that is so arranged that a plurality of follow-up mechanisms or motor means may be concurrently controlled by a single controller, the arrangement being such that each follow-up mechanism or motor means positively moves to a position corresponding to the position of the controller, it being impossible for the follow-up mechanism or motor means to become "out-of-step" for any length of time.

Electrical proportioning or follow-up systems of this general character have been in use for a period of time. In one such type, the motor means is controlled by a pair of normally equally energized electromagnetic coils, or a center-tapped coil, which control suitable switching mechanism. The energizations of the electromagnetic coils or of the two portions of the center-tapped coil have been controlled by the conjoint operation of a controlling potentiometer and a balancing potentiometer, the former being operated in any desired manner, either automatically or manually, and the latter being operated by the motor means.

It is often desirable to control two or more of such motor means or follow-up mechanisms from a single controller or control potentiometer. In the electrically balanced systems of the type herein above described, it has been impossible to have a single controller directly control two or more such follow-up mechanisms since they could get "out-of-step" so that the positions of the various follow-up mechanisms or motor means did not correspond to the position of the controller.

In order to obtain a somewhat similar result, it has been usual practice to have one follow-up mechanism or motor means operate a controlling potentiometer for a second motor means, as well as operate its own balancing potentiometer. In this manner, a number of follow-up mechanisms could be hooked up in tandem. This system, however, has its objection in that the movements of all the motor means is not simultaneous, there being a considerable delay between movement of the first and last if any considerable number of motor means were so hooked up in tandem.

An object of the present invention, therefore, is the provision of an electrically balanced or electrically operated follow-up or proportioning system which is so arranged that a number of motor means may be simultaneusly and concurrently controlled from a single controller, the electrical arrangement of the system being such that the various motor means cannot get "out-of-step" or at least cannot remain "out-of-step" for any length of time.

More specifically, an object of the present invention is the provision of an electrical follow-up system or proportioning system in which each of a plurality of follow-up mechanisms, each comprising a balanced electromagnetic means, contact means, motor means and balancing reactance means, is electrically interconnected with suitable impedance means in such manner that its particular electromagnetic means can only be balanced by the action of its own associated balancing impedance means, even though a plurality of such systems are directly connected to a single controlling variable reactance means.

A further object of the invention is the provision of a multiple proportioning system in which a single potentiometer controller directly controls a plurality of balanced relay means, the energizations of the balanced relay means being maintained in balance by the action of associated balancing potentiometers driven by motor means controlled by the relay means, suitable impedances being so associated with the individual relay means and balancing potentiometers as to insure that each relay means will only be rebalanced upon movement of the motor means, which it controls, to the position demanded by the controlling potentiometer.

The system of the present invention is particularly adapted to temperature control systems, and the like, and will be explained in detail in connection with such a system.

Further objects of the invention will be found in the drawings, the claims and the detailed description.

The term "impedance" as used in the specification and claims is intended to mean any device or apparatus by which the flow of electrical current may be varied, and particularly resistance or inductance.

For a more complete understanding of the invention, reference may be had to the following detailed description and accompanying drawings, in which.

Figure 1:
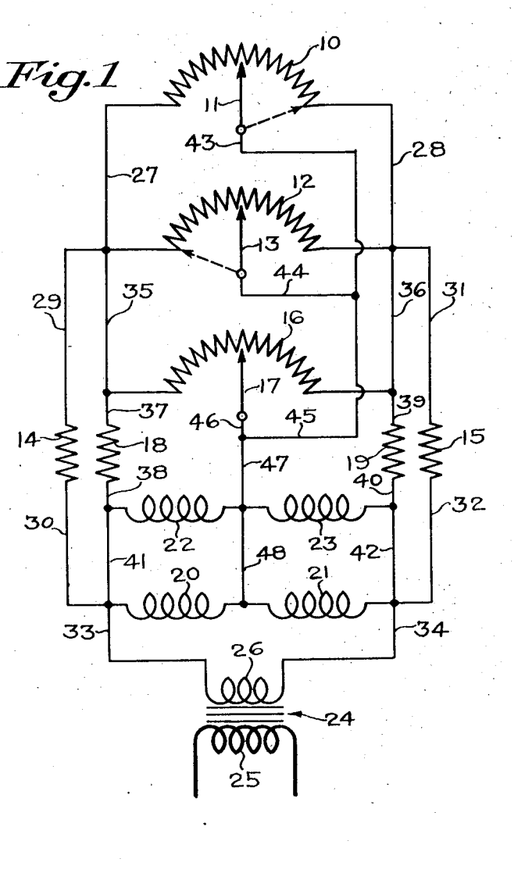
Fig. 1 is a digrammatic showing of the limitations of the type of system heretofore used.

Referring first to Fig. 1 of the drawings, there is diagrammatically shown the fundamentals of the manner in which a pair of electrical follow-up systems of the type now utilized in the art would be connected in parallel to a single controller. The single controller is shown comprising a resistance 10 and a cooperating control contact 11. The balancing mechanism of a first follow-up system is indicated by the first balancing resistance 12 and first balancing contact finger 13. Associated with this balancing resistance 12 is a pair of protective resistances 14 and 15. Similarly, the balancing mechanism of the second electrical follow-up mechanism is indicated by a second balancing resistance 16 and a cooperating balance contact 17. Associated with the balancing resistance 16 is a pair of protective resistances 18 and 19. The first electrically balanced follow-up system additionally includes a pair of series connected electromagnetic coils 20 and 21 whereas the second electrically balanced follow-up system includes a pair of series connected electromagnetic coils 22 and 23.

Electrical power is shown as being furnished by a step-down transformer 24, having a high voltage primary 25 and a low-voltage secondary 26. It will be noted that the control resistance 10 and the first balancing resistance 12 are connected in parallel with each other by wires 27 and 28 and are connected in parallel with the series-connected electromagnetic coils 20 and 21, through protective resistances 14 and 15, by wires 29, 30, 31 and 32. Wires 33 and 34 connect the secondary 26 to the wires 30 and 32 so that the electromagnetic coils 20 and 21, in series, are connected across the secondary 26 and the control resistance 10, as well as the first balancing resistance 12, are connected across the secondary 26 through the protective resistances 14 and 15.

In a similar manner, the control resistance 10 is connected in parallel with the second balancing resistance 16 by means of wires 27, 28, 35 and 36. Also, this control resistance 10 and the second balancing resistance 16 are connected in parallel with the series-connected electromagnetic coils 22 and 23, through protective resistances 18 and 19, by wires 37, 38, 39 and 40. Wires 33 and 34, and wires 41 and 42 connect the series-connected electromagnetic coils 22 and 23 across the secondary 26 and also connect the control resistance 10 and second balancing resistance 16, through the protective resistances 18 and 19, across the source of power 26.

The control contact 11, the first balancing contact 13, the second balancing contact 17, the junction of electromagnetic coils 22 and 23, and the junction of electromagnetic coils 20 and 21 are all interconnected by means of wires 43, 44, 45, 46, 47 and 48.

With the parts in the full line position wherein the control contact 11, the first balancing contact 13 and the second balancing contact 17 are respectively engaged with the mid-portions of control resistance 10, the first balancing resistance 12 and the second balancing resistance 16, it will be evident that all of the electromagnetic coils 20, 21, 22 and 23 are equally energized. Under these conditions, as is well-known in the art, the motor means which controls the balancing potentiometers in electrical follow-up systems of the type referred to herein would be deenergized and the balancing potentiometers would remain stationary.

Now, if the control contact 11 were moved to the dotted position wherein it engages the extreme right-hand end of control resistance 10, electromagnetic coil 21 of the first follow-up mechanism would be completely short-circuited except for the inclusion of protective resistance 15. This partial short-circuit is as follows: from the junction of electromagnetic coils 20 and 21, wire 48, wire 47, wire 45, wire 43, control contact 11, wire 28, wire 31, protective resistance 15, and wire 32 to the right hand end of electromagnetic coil 21. Similarly, the electromagnetic coil 23 of the second follow-up mechanism would be completely short-circuited were it not for the protective resistance 19. This substantial short-circuit is as follows: from the junction of electromagnetic coils 22 and 23, wire 47, wire 45, wire 43, control contact 11, wire 28, wire 36, wire 39, protective resistance 19, and wire 40 to the right-hand end of electromagnetic coil 23. The electromagnetic coils 20 and 22 are therefore more highly energized than electromagnetic coils 21 and 23 and the two follow-up systems should be operated so as to move their respective balancing contacts 13 and 17 along their balancing resistances 12 and 16 towards their left-hand ends to cause rebalancing of the energizations of the two sets of electromagnetic coils.

However, assume that for some reason the balancing contact 17 of the second follow-up mechanism did not operate or remained stationary, and that the balancing contact 13 of the first follow-up mechanism was moved to the dotted position shown wherein it engages the extreme left-hand end of its associated balancing resistance 12. Under these conditions, electromagnetic coil 20 is substantially short-circuited, complete short-circuiting being prevented by reason of the inclusion of protective resistance 14. This partial short-circuit is as follows: from the junction of electromagnetic coils 20 and 21, wires 48, 47, wire 45, wire 44, balancing contact 13, wire 29, protective resistance 14, and wire 30 to the left-hand end of electromagnetic coil 20. Likewise, the electromagnetic coil 22 is substantially completely short-circuited, complete short-circuiting being prevented by reason of the inclusion of protective resistance 18. This partial short-circuit is as follows: from the junction of electromagnetic coils 22 and 23, wire 47, wire 45, wire 44, balancing contact 13, wire 35, wire 37, protective resistance 18, and wire 38 to the left hand end of electromagnetic coil 22. Electromagnetic coils 20 and 21, and electromagnetic coils 22 and 23 are now equally energized, and will be equally energized with control contact 11 and balancing contact 13 in the dotted positions shown irrespective of the position of balancing contact 17. It is therefore obvious that the energizations of the two sets of electromagnetic coils can be balanced out where two of the present type of electrically balanced follow-up systems are connected in parallel with a single controller, even though only one balancing potentiometer has been operated to the proper position. In fact, upon inspection of the system of Fig. 1, it will be seen that the electromagnetic coils will be equally energized whenever any one of the contacts 11, 13 and 17 is in one extreme position and any other of these remaining contacts is in the opposite extreme position. Therefore, it will be seen that there is no manner of positively providing that the two or more electrically balanced follow-up systems will remain in proper step or proper relation to the position of the control contact 11.

Figure 2:
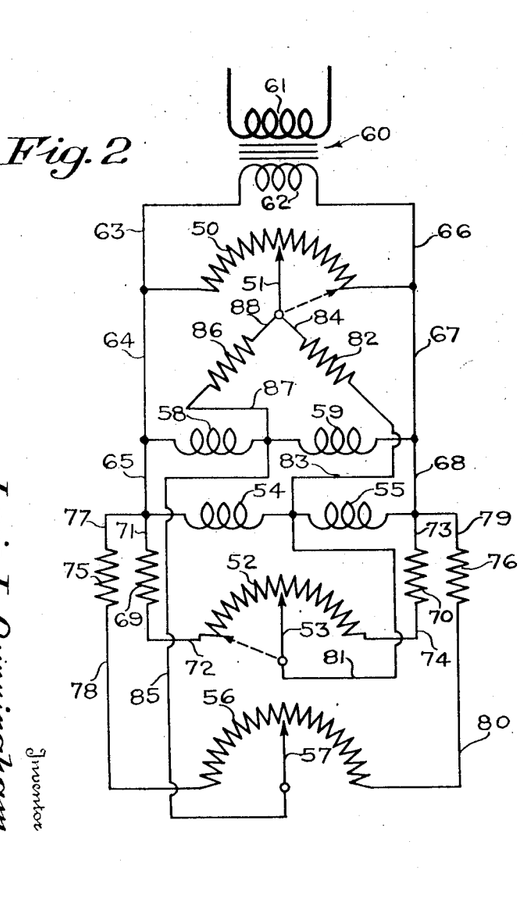
Fig. 2 is a diagrammatic showing, similar to Fig. 1, but disclosing the fundamentals of the system of the present invention.

Turning now to Fig. 2, there is a diagrammatic showing of the fundamentals of the system of the present invention. In the showing of Fig. 2, a single controller is indicated by the control resistance 50 and the cooperating control contact 51. A first balancing mechanism is indicated by the balancing resistance 52 and the associated balancing contact 53. The first balancing follow-up system further includes a pair of series-connected electromagnetic coils 54 and 55. A second balancing mechanism is indicated by a resistance 56 and a cooperating balancing contact 57. Associated with the balancing resistance 56 and balancing contact 57 is a pair of series-connected electro-magnetic coils 58 and 59. A source of power is indicated by the step-down transformer 60 which is provided with a high voltage primary 61 and low voltage secondary 62. The control resistance 50 and the two sets of series connected electro-magnetic coils 54 and 55 and 58 and 59 are all connected in parallel with each other and across the secondary 62 by wires 63, 64, 65, 66, 67 and 68. The balancing resistance 52 is connected in parallel with its associated series-connected electromagnetic coils 54 and 55, through protective resistances 69 and 70, by wires 71, 72, 73 and 74.

Similarly, the balancing resistance 56 is connected in parallel with its associated series-connected electromagnetic coils 58 and 59, through protective resistances 75 and 76, by wires 65, 77, 78, 68, 79 and 80. The junction of electromagnetic coils 54 and 55 is connected to the associated balancing contact 53 by a wire 81 and is also connected to the control contact 51, through a resistance 82, by wires 83 and 84. In a like manner, the junction of electromagnetic coils 58 and 59 is connected to the balancing contact 57 by a wire 85, and is connected to the control contact 51, through a protective resistance 86, by means of wires 87 and 88.

Again, with the parts in the position shown in Fig. 2, it will be evident that the energizations of the electromagnetic coils 54 and 55 and 58 and 59 are equal. If the control contact 51 is moved to the dotted position shown wherein it engages the extreme right hand end of control resistance 50, electromagnetic coil 55 will be substantially completely short-circuited, complete short-circuiting being prevented by the resistance 82. This partial short-circuit is as follows: from the junction of electromagnetic coils 54 and 55, wire 83, resistance 82, wire 84, control contact 51, wire 67 and wire 68 to the right hand end of electromagnetic coil 55. In a similar manner, electromagnetic coil 59 will be substantially completely short-circuited, complete short-circuiting being prevented by reason of the resistance 86. This partial short-circuit is as follows: from the junction of electromagnetic coils 58 and 59, wire 87, resistance 86, wire 88, control contact 51, and wire 67, to the right-hand end of electromagnetic coil 59.

Now assuming that the balancing contact 53 moves to the dotted position wherein it is engaging the extreme left-hand end of its associated balancing resistance 52 and that the balancing contact 57 remains stationary, electromagnetic coil 54 will be substantially completely short-circuited, complete short-circuiting being prevented by reason of the protective resistance 69. This partial short-circuit is as follows: from the junction of electromagnetic coils 54 and 55, wire 81, balancing contact 53, wire 72, protective resistance 69, and wire 71 to the left-hand end of electromagnetic coil 54. By properly proportioning the protective resistance 69 and the resistance 82, the electromagnetic coils 54 and 55 will now be equally energized. Because of certain other circuits involved, this equal energization of electromagnetic coils 54 and 55 is not obtained by having the resistances 69 and 82 of equal value.

While the energization of electromagnetic coil 58 is changed upon movement of the control contact 51 to the dotted position and movement of the balancing contact 53 to the dotted position, the energizations of electromagnetic coils 58 and 59 are not made equal. For instance, in trying to trace a shunt circuit for electromagnetic coil 58 through its associated protective resistance 75, it will be seen that this shunt circuit is as follows: from the junction of electromagnetic coils 58 and 59, wire 85, balancing contact 57, the left-hand portion of balancing resistance 56, wire 78, protective resistance 75, wire 77, and wire 65 to the left-hand end of electromagnetic coil 58. It will be seen that this shunt circuit not only includes the protective resistance 75 but also includes half of the balancing resistance 56. Therefore, if the protective resistance 75 and the resistance 86 are properly proportioned equal energizations of electromagnetic coils 58 and 59 can only result provided the balancing contact 57 moves to the extreme left-hand end of balancing resistance 56.

In this manner, by segregating the connections between the control contact 51 and the junctions of the sets of electromagnetic coils 54 and 55 and 58 and 59, through the interposition of resistances such as resistances 82 and 86, it has been found impossible to rebalance the energizations of each of the sets of electromagnetic coils 54 and 55 and 58 and 59 unless their respectively associated balancing contacts 53 and 57 move to positions along their balancing resistances 52 and 56 in conformity with the position which the control contact 51 has assumed upon control resistance 50. In this manner, it is positively assured that the various follow-up mechanisms will keep in proper step with the movements of the control contact 51.

While it would probably be possible to give a number of very detailed and highly complicated electrical theoretical explanations as to why exact positioning of the balancing contacts 53 and 57 must be had in order to equalize the energizations of the respective sets of electromagnetic coils 54 and 55 and 58 and 59, it is thought that the above comparison of the conditions that may arise in the system of Fig. 1 and are prevented by the system of Fig. 2 will suffice to show the underlying principle of the present invention.

Figure 3:
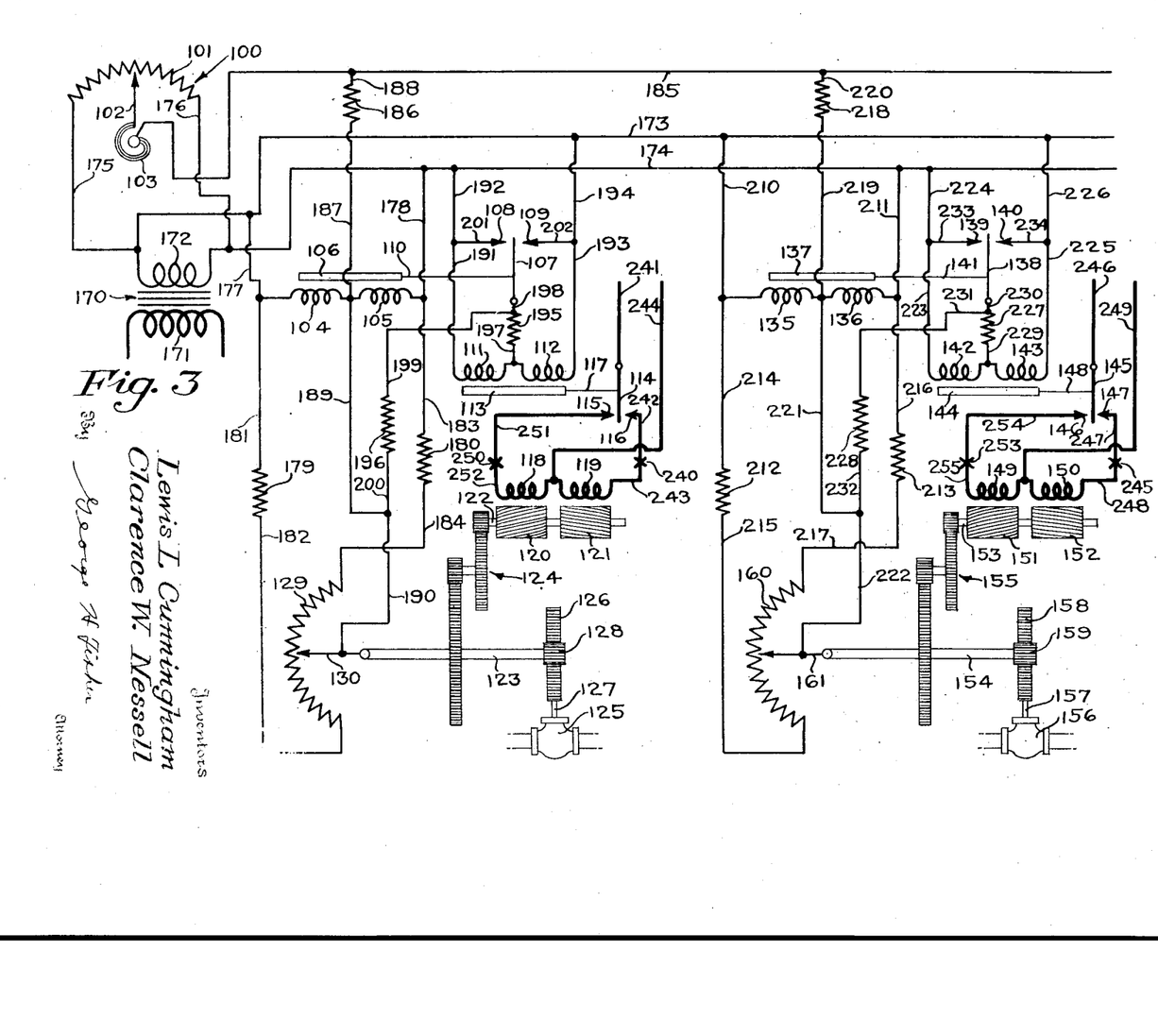
Fig. 3 is a diagrammatic showing of a complete application of the present invention.

Referring now to Fig. 3, a complete diagrammatic showing of the control of a pair of electrically balanced follow-up systems by a single controller is disclosed. The single controller is shown as a control potentiometer, generally indicated at 100, which comprises a control resistance 101 and a cooperating control contact or movable member 102. The control contact 102 may be positioned manually or automatically in any desired manner and is herein shown as controlled by temperature changes, the control element being indicated at 103 and being illustrated as a bimetallic element.

The first electrically balanced follow-up mechanism includes a pair of series-connected solenoid coils 104 and 105 that conjointly control the position of a single plunger or armature 106. The armature 106 controls a double-circuit switching mechanism comprised by a switch arm 107 and a pair of cooperating contacts 108 and 109. The arrangement is such that switch arm 107 may be disposed between contacts 108 and 109 and not engaging either of them or may be selectively moved into engagement with either of them. This switch arm 107 is connected to plunger 106 by a nonmagnetic connection 110.

This switching mechanism 107—108—109 controls a balanced relay that includes a pair of series-connected relay windings 111 and 112. These relay windings 111 and 112 cooperate in the control of a single plunger or armature 113. The plunger 113 controls a double-circuit switching mechanism comprising a switch arm 114 and a pair of spaced cooperating contacts 115 and 116. The arrangement is such that switch arm 114 may be disposed between the contacts 115 and 116 so that it engages neither of them or it may be selectively moved into engagement with either of them. This switch arm 114 is connected to the plunger 113 by a non-magnetic connection 117.

The switching mechanism 114—115—116 selectively controls the energization of a pair of high voltage field windings 118 and 119 which form a part of a reversible electric motor means. Associated with the respective field windings 118 and 119 are motor rotors 120 and 121 which are secured to a common rotor shaft 122. While the reversible electric motor means has been herein shown as a pair of induction motors, it will be evident that any other suitable type of reversible electric motor means could be utilized.

The rotor shaft 122 is connected to a main operating shaft 123 through suitable reduction gearing indicated at 124. The main operating shaft 123 may be utilized to position any desired member and is herein shown as positioning a valve 125 which has a rack 126 connected to its stem 127. A pinion 128 cooperates with the rack 126 and is secured to the main operating shaft 123. The main operating shaft 123 also controls a balancing potentiometer comprising a balancing resistance 129 and a cooperating balancing contact 130 which is secured to or operated by the main operating shaft 123.

The second electrically balanced follow-up system includes a pair of series-connected solenoid coils 135 and 136 which conjointly control an associated plunger or armature 137. This plunger 137 controls a double-circuit open contact switching mechanism that includes a switch arm 138 and a pair of cooperating contacts 139 and 140. The arrangement is such that the switch arm 138 may be disposed intermediate the two contacts 139 and 140 so as to engage neither of them or may be selectively moved into engagement with either of them. The switch arm 138 is connected to plunger 137 by a non-magnetic connection 141.

The switching mechanism 138—139—140 controls a balanced relay that includes relay windings 142 and 143 which are connected in series. These series connected relay windings 142 and 143 conjointly control the position of a plunger or armature 144. The plunger 144 controls a double-circuit open contact switching mechanism that includes a switch arm 145 and cooperating contacts 146 and 147. Here again, the arrangement is such that the switch arm 145 may be disposed intermediate contacts 146 and 147 so that it engages neither of them or may be selectively moved into engagement with either of them. The plunger 144 is connected to the switch arm 145 by a non-magnetic connection 148.

The switching mechanism 145—146—147 selectively controls the energization of a pair of high voltage field windings 149 and 150. These field windings 149 and 150 respectively cooperate with motor rotors 151 and 152 which are secured to a common rotor shaft 153. It will be evident that the two field windings and two motor rotors comprise a reversible motor means and it is to be understood that any other suitable type of reversible motor means could be utilized.

The rotor shaft 153 is coupled to a main operating shaft 154 through reduction gearing indicated generally at 155. This main operating shaft 154 may be utilized to position any desired device and is herein shown as controlling a valve 156. The valve 156 is provided with the usual stem 157 to which a rack 158 is secured. A pinion 159 cooperates with the rack 158 and is secured to the main operating shaft 154. The main operating shaft 154 also controls a balancing potentiometer which comprises a balancing resistance 160 and a cooperating balancing contact 161 which is secured to or operated by the main operating shaft 154.

Low voltage electrical power is supplied to the controller 100 and to the two electrically balanced follow-up mechanisms by means of a step-down transformer 170 that is provided with a high voltage primary 171 and a low voltage secondary 172. Wires 173 and 174 are connected to the opposite sides of low voltage secondary 172 and may be utilized to supply energy to similar further electrically balanced follow-up mechanisms as will be apparent from an inspection of the drawings.

The control resistance 101 has its opposite ends connected to wires 173 and 174, respectively, by wires 175 and 176. The series-connected solenoid coils 104 and 105 are also connected to the wires 173 and 174 by wires 177 and 178. The balancing resistance 129 has its ends connected to wires 177 and 178 through protective resistances 179 and 180 by wires 181, 182, 183 and 184. A wire 185 is connected to the bimetallic element 103 and therefore to the control contact 102. The junction of solenoid coils 104 and 105 is connected to this wire 185, through a resistance 186, by wires 187 and 188. The junction of solenoid coils 104 and 105 is further connected to the balancing contact 130 by wires 189 and 190.

The relay windings 111 and 112, in series, are connected to the wires 174 and 173 by wires 191, 192, 193 and 194. The junction of relay windings 111 and 112 is connected to the switch arm 107, through a resistance 195, and to the junction of solenoid coils 104 and 105, through a resistance 196, by wires 197, 198, 199, 200 and 189. The contact 108 is connected to the junction of wires 191 and 192 by a wire 201 and the contact 109 is connected to the junction of wires 193 and 194 by a wire 202.

The solenoid coils 135 and 136, the relay windings 142 and 143, and all the other associated parts of the second electrically balanced follow-up mechanism are inter-connected and connected to wires 173, 174 and 185 in a manner similar to that just described in connection with the first electrically balanced follow-up mechanism. In other words, the series-connected solenoid coils 135 and 136 are connected to the wires 173 and 174 by wires 210 and 211. The balancing resistance 160 has its opposite ends connected to wires 210 and 211, through protective resistances 212 and 213, by wires 214, 215, 216 and 217. The junction of solenoid coils 135 and 136 is connected to wire 185, through a resistance 218, by wires 219 and 220. This junction of solenoid coils 135 and 136 is also connected to the balancing contact 161 by wires 221 and 222.

The relay windings 142 and 143, in series, are connected to the wires 174 and 173 by wires 223, 224, 225 and 226. The junction of relay windings 142 and 143 is connected to switch arm 138, through a resistance 227, and to the junction of solenoid coils 135 and 136, through a resistance 228, by wires 229, 230, 231, 232, and 221. Contact 139 is connected to wires 223 and 224 by a wire 233 and contact 140 is connected to wires 225 and 226 by a wire 234.

Operation of the system of Fig. 3

Referring to Fig. 3 of the drawings, it will be noted that the two sets of series-connected solenoid coils 104 and 105 and 135 and 136 and the control resistance 101 are all connected across the source of power or secondary 172 and are all in parallel with each other. The balancing resistance 129 is in parallel with the series connected solenoid coils 104 and 105 but the protective resistances 179 and 180 are interposed in this circuit. Similarly, the balancing resistance 160 is connected in parallel with the series-connected solenoid coils 135 and 136 except that the protective resistances 212 and 213 are included in the circuit. The analogy between these parts and the diagrammatic showing of Fig. 2 should now be apparent. With the parts in the position shown wherein the control contact 102 is engaging the middle of control resistance 101 and the two balancing contacts 130 and 161 are engaging the middle of balancing resistance 129 and 160, it will be apparent that solenoid coils 104 and 105 are equally energized and solenoid coils 135 and 136 are equally energized. The switch arms 107 and 138 are therefore disposed intermediate their cooperating contacts 108 and 109 and 139 and 140. The relay windings 111 and 112 are therefore equally energized since they are connected in series across the secondary 172 and the relay coils 142 and 143 are equally energized for the same reason. The switch arms 114 and 145 are therefore disposed intermediate their cooperating contacts 115, 116 and 146 and 147. As a result, none of the field windings, 118, 119, 149 or 150 is energized and the two main operating shafts 123 and 154 are stationary. The valves 125 and 156 are in half open position.

Now assume that the temperature to which bi-metallic element 103 responds should suddenly rise to a point wherein the control contact 102 is moved instantaneously to the extreme right-hand end of control resistance 101. Solenoid coil 105 is thereupon substantially short circuited, complete short circuiting being prevented by the resistance 186. This partial short circuit is as follows: from the junction of solenoid coils 104 and 105, wire 187, resistance 186, wire 188, wire 185, bi-metallic element 103, control contact 102, wire 176, wire 174, and wire 178 to the right-hand end of solenoid coil 105. Plunger 106 therefore moves to the left and brings switch arm 107 into engagement with contact 108. Such engagement of arm 107 with contact 108 places the resistance 195 in parallel with the relay winding 111 and the full flow of current through relay winding 111 and resistance 195, in parallel, traverses the relay winding 112. This circuit is as follows: secondary 172, wire 173, wire 194, wire 193 and relay winding 112, at which point the circuit splits, part going by way of relay winding 111, wire 191, wire 192, and wire 173 to the other side of secondary 172, whereas the other portion goes by way of wire 197, resistance 195, wire 198, switch arm 107, contact 108, wire 201, and wire 192 to wire 173 and the same side of secondary 172. Engagement of switch arm 107 with contact 108 also sets up an auxiliary flow of current through solenoid coil 104 and resistance 196 by a circuit which is as follows: secondary 172, wire 173, wire 177, solenoid coil 104, wire 189, wire 200, resistance 196, wire 199, wire 198, switch arm 107, contact 108, wire 201, wire 192, and wire 174 to the other side of secondary 172. This auxiliary flow of current through the solenoid coil 104 increases the pull on plunger 106 so that switch arm 107 is held in firm engagement with contact 108.

Since relay winding 112 is now more highly energized than relay winding 111, plunger 113 moves to the right and switch arm 114 engages contact 116 whereupon the field winding 119 is energized. The circuit for field winding 119 includes a limit switch diagrammatically indicated at 240 which may be operated in any of the usual manners by the main operating shaft 123 so as to limit the movement of shaft 123 in counterclockwise direction as viewed from the left. The circuit for the field winding 119 is as follows: line wire 241, switch arm 114, contact 116, wire 242, limit switch 240, wire 243 and field winding 119 to line wire 244. Energization of field winding 119 causes rotation of motor rotor 121 in counter-clockwise direction, as viewed from the left, whereupon main operating shaft 123 is also rotated in counter-clockwise direction as viewed from the left. Balancing contact 130 therefore moves downwardly along balancing resistance 129 towards its lower end and the rack 126 is moved downwardly to close valve 125. This movement of balancing contact 130 along balancing resistance 129 will continue until the balancing contact 130 engages the extreme lower end of balancing resistance 129 and is directly connected to the wire 182. When this occurs, the solenoid coil 104 is substantially short circuited, complete short circuiting being prevented by protective resistance 179. This partial short circuit is as follows: from the junction of solenoid coils 104 and 105, wire 189, wire 190, balancing contact 130, wire 182, protective resistance 179, and wire 181 to the left-hand end of solenoid coil 104. The solenoid coils 104 and 105 are now substantially equally energized again and the plunger 106 moves far enough to the right to disengage switch arm 107 from 108. When this occurs, the resistance 195 is disconnected from its parallel relationship with relay winding 111 whereupon relay windings 111 and 112 are again connected in series across the secondary 172 and plunger 113 returns to its central position. Switch arm 114, therefore, disengages contact 116 and field winding 119 is de-energized. This movement of main operating shaft 123 has completely closed valve 125.

Engagement of control contact 102 with the extreme right-hand end of control resistance 101 also substantially short-circuits the solenoid coil 136, complete short circuiting being prevented by reason of the inclusion of resistance 218. This partial short circuit is as follows: from the junction of solenoid coils 135 and 136, wire 219, resistance 218, wire 220, wire 185, bi-metallic element 103, control contact 102, wire 176, wire 174, and wire 211 to the right-hand end of solenoid coil 136. Plunger 137 thereupon moves to the left and switch arm 138 moves into engagement with contact 139. Engagement of switch arm 138 with contact 139 places the resistance 227 in parallel with relay winding 142 so that the current flow through both the relay winding 142 and the resistance 227 traverses the relay winding 143. This circuit is as follows: secondary 172, wire 173, wire 226, wire 225 and relay winding 143, at which point the circuit branches, part going by way of relay winding 142, wire 223, wire 224 and wire 174 to the other side of secondary 172 whereas the other portion goes by way of wire 229, resistance 227, wire 230, switch arm 138, contact 139, wire 233 and wire 224 to wire 174 and the same side of secondary 172. Plunger 144 therefore moves to the right and switch arm 145 is moved into engagement with contact 147.

Engagement of switch arm 138 with contact 139 also sets up an auxiliary circuit through solenoid coil 135 and resistance 228 which is as follows: secondary 172, wire 173, wire 210, solenoid coil 135, wire 221, wire 232, resistance 228, wire 231, wire 230, switch arm 138, contact 139, wire 233, wire 224 and wire 174 to the other side of secondary 172. This auxiliary circuit for solenoid coil 135 increases the pull on armature or plunger 137 so as to maintain switch arm 138 in firm engagement with contact 139. Field winding 150 is energized, upon engagement of switch arm 145 and contact 147, through a limit switch 245, by a circuit which is as follows: line wire 246, switch arm 145, contact 147, wire 247, limit switch 245, wire 248 and field winding 150 to line wire 249. Rotor 152 is therefore rotated in a counter-clockwise direction as viewed from the left and main operating shaft 154 is operated in the same direction. Valve 156 is therefore moved towards closed position and balancing contact 161 moves downwardly along balancing resistance 160. When balancing contact 161 reaches the extreme lower end of balancing resistance 160, the solenoid coil 135 is substantially completely short-circuited, complete short-circuiting being prevented by reason of the protective resistance 212. This partial short-circuit is as follows: from the junction of solenoid coils 135 and 136, wire 221, wire 222, balancing contact 161, wire 215, protective resistance 212 and wire 214 to the left hand end of solenoid coil 135. The energizations of solenoid coils 135 and 136 are therefore substantially equal and plunger 137 moves far enough to the right to disengage switch arm 138 from contact 139. The resistance 227 is therefore removed from its parallel relationship with relay winding 142 and relay windings 142 and 143 are again equally energized. Plunger 144 therefore moves to its central position and switch arm 145 disengages contact 147 whereupon field winding 150 is deenergized. The valve 156 has now been moved to fully closed position.

If, on the other hand, the temperature to which bimetallic element 103 responds should instantaneously fall to such an extent that control contact 102 moves to the extreme left end of control resistance 101, so that control contact 102 is directly connected to wire 175, then the opposite action takes place. Under these conditions, solenoid coil 104 is substantially completely short-circuited, complete short-circuiting again being prevented by inclusion of resistance 186. This partial short-circuit is as follows: from the junction of solenoid coils 104 and 105, wire 187, resistance 186, wire 188, wire 185, bi-metallic element 103, control contact 102, wire 175, wire 173 and wire 177 to the left-hand end of solenoid coil 104. Solenoid coil 105 is now more highly energized than solenoid coil 104 and plunger 106 moves to the right and brings switch arm 107 into engagement with contact 109. The resistance 195 is now placed in parallel with relay winding 112 and the circuits for relay windings 111 and 112 and resistance 195 are as follows: secondary 172, wire 174, wire 192, wire 191 and relay winding 111, at which point the circuit splits, part going by way of relay winding 112, wire 193, wire 194 and wire 173 to the other side of secondary 172, whereas the other portion goes by way of wire 197, resistance 195, wire 198, switch arm 107, contact 109, wire 202, and wire 194 to wire 173 and the same side of secondary 172. Relay winding 111 is therefore more highly energized than relay winding 112 and switch arm 114 is moved into engagement with contact 115. Engagement of switch arm 107 and contact 109 also sets up an auxiliary circuit through solenoid coil 105 and resistance 196 which is as follows: secondary 172, wire 174, wire 178, solenoid coil 105, wire 189, wire 200, resistance 196, wire 199, wire 198, switch arm 107, contact 109, wire 202, wire 194 and wire 173 to the secondary 172. Field winding 118 is energized by engagement of switch arm 114 and contact 115, through a limit switch 250, by the following circuit: line wire 241, switch arm 114, contact 115, wire 251, limit switch 250, wire 252, and field winding 118 to line wire 244. Rotor 120 is therefore rotated in a clockwise direction as viewed from the left and main operating shaft 123 rotates in the same direction. This causes upward movement of rack 126 and consequent opening movement of valve 125. Such movement of main operating shaft 123 also causes movement of balancing contact 130 upwardly along balancing resistance 129.

When the balancing contact 130 has completely traversed balancing resistance 129, then solenoid coil 105 is substantially completely short-circuited by a circuit as follows: from the junction of solenoid coils 104 and 105, wire 189, wire 190, balancing contact 130, wire 184, protective resistance 180 and wire 183, to the right hand end of solenoid coil 105. Solenoid coils 104 and 105 are thereupon again substantially equally energized and plunger 106 moves to the left so as to move switch arm 107 from engagement with contact 109. Resistance 195 is thereupon removed from its parallel relationship with relay winding 112, and switch arm 114 disengages contact 115 thereby deenergizing field winding 118. This separation of switch arm 107 from contact 109 also interrupts the auxiliary circuit through solenoid coil 105 and resistance 196. Valve 125 is now completely opened.

Such engagement of control contact 102 with the extreme left-hand end of control resistance 101 operates upon the second follow-up mechanism in the manner just described for the first follow-up mechanism. In other words, solenoid coil 136 is substantially short-circuited by the following circuit: from the junction of solenoid coils 135 and 136, wire 219, resistance 218, wire 220, wire 185, bimetallic element 103, control contact 102, wire 175, wire 173, and wire 210 to the left hand end of solenoid coil 135. Plunger 137 thereupon moves to the right and switch arm 138 engages contact 140. Resistance 227 is thereupon placed in parallel with relay winding 143 and the circuit for relay windings 142 and 143 and resistance 227 is as follows: secondary 172, wire 174, wire 224, wire 223 and relay winding 142, at which point the circuit splits, one portion going by way of relay winding 143, wire 225, wire 226 and wire 173 to the opposite side of secondary 172 whereas the other portion goes by way of wire 229, resistance 227, wire 230, switch arm 138, contact 140, wire 234 and wire 226 to wire 173 and the same side of secondary 172. Relay winding 142 is therefore more highly energized than relay winding 143 and plunger 144 moves to the left bringing switch arm 145 into engagement with contact 146. Engagement of switch arm 138 with contact 140 also sets up an auxiliary circuit through solenoid coil 136 and resistance 228 which is as follows: secondary 172, wire 174, wire 211, solenoid coil 136, wire 221, wire 232, resistance 228, wire 231, wire 230, switch arm 138, contact 140, wire 234, wire 226 and wire 173 to the opposite side of secondary 172. This auxiliary current flow through solenoid coil 136 causes switch arm 138 to be held firmly in engagement with contact 140.

Engagement of switch arm 145 with contact 146 causes energization of field winding 149 through a limit switch 253 by a circuit which is as follows: line wire 248, switch arm 145, contact 146, wire 254, limit switch 253, wire 255 and field winding 149 to line wire 249. Rotor 151 is therefore rotated in a clockwise direction as viewed from the left and main operating shaft 154 is rotated in a similar direction. Rack 155 moves upwardly and valve 156 is moved towards open position. Such movement of main operating shaft 154 also moves balancing contact 161 upwardly along balancing resistance 160.

When balancing contact 161 has completely traversed balancing resistance 160, solenoid coil 136 is substantially short-circuited as follows: from the junction of solenoid coils 135 and 136, wire 221, wire 222, balancing contact 161, wire 217, protective resistance 213 and wire 216 to the right-hand end of solenoid coil 136. Solenoid coils 135 and 136 are thereupon substantially equally energized and plunger 137 moves towards the left sufficiently to disengage switch arm 138 from contact 140. The resistance 227 is therefore removed from its parallel relationship with relay winding 143 whereupon relay windings 142 and 143 are again connected in series across the secondary 172 and are equally energized. Plunger 144 therefore returns to its central position wherein switch arm 145 is disengaged from contact 146. Field winding 149 is thereupon de-energized. Disengagement of switch arm 138 from contact 140 also interrupts the auxiliary flow of current through solenoid coil 136 and resistance 228 whereupon solenoid coils 135 and 136 are again equally energized. Valve 156 is now in its full open position.

In the foregoing description, two extreme positions of control contact 102 have been described so that the description of Fig. 3 is in conformity with the illustrations already set out in connection with Fig. 1 and Fig. 2. In actual practice, if the control contact 102 is controlled automatically by a condition responsive member such as the bimetallic element 103, the movements of control contact 102 along control resistance 101 will be relatively slow. As soon as this movement of control contact 102 in respect to control resistance 101 has been sufficiently great to unbalance the voltage drops across solenoid coils 104 and 105 sufficiently to lightly engage switch arm 107 with either of contacts 108 or 109, a follow-up action will take place. The reason for the auxiliary current flows described in connection with solenoid coils 104 and 105 is to immediately increase the contact pressure between the switch arm 107 and either of the contacts 108 or 109 upon the very light engagement between these parts. This insures a good firm contact. Plunger 113 is thereupon operated as previously described to energize one or the other of field windings 118 or 119 to drive balancing resistance 130 in the proper direction to rebalance the voltage drops across solenoid coils 104 and 105 sufficiently to barely separate switch arm 107 from the particular contact 108 or 109 with which it is in engagement. Immediately this separation takes place, as brought out in the above description, the auxiliary current flow through solenoid coil 104 or coil 105 is interrupted whereupon the separation between switch arm 107 and either of the contacts 108 or 109 is substantially increased so that further movement of the main operating shaft 123 cannot take place until there is a reasonable movement of control contact 102 in respect to control resistance 101. As indicated above, the limit switches 240 and 250 are operated in the usual well-known manner to limit the extreme movements of main operating shaft 123. While for the sake of clearness the extreme positions have been shown as being reached by a balancing out process wherein the balancing contact 130 moves to the extreme end of balancing resistance 129, in actual practice the balancing out of the voltage drops across solenoid coils 104 and 105 is not relied upon for the extreme positions but the limit switches 240 and 250 are utilized to obtain exact stopping of the main operating shaft 123 when the desired extreme position is reached.

The above comments are all equally applicable to the second follow-up system which includes the solenoid coils 135 and 136 and the associated control apparatus.

For a more complete understanding of the manner in which these follow-up systems operate generally, reference may be had to the copending application of Lewis L. Cunningham, S. N. 673,236, which was filed May 27, 1933.

In this system of Fig. 3, the two follow-up systems will stay in exact step in relation to the position of control contact 102 for the same reason as set forth in connection with Fig. 2. In other words, the junctions of the two sets of solenoid coils 104 and 105 and 135 and 136 are individually connected to the control contact 102 through individual resistances 186 and 218 so that even though control contact 102 goes to an extreme position and one of the balancing contacts 130 or 161 goes to an opposite extreme position, still only that set of solenoid coils which is directly associated with the particular balancing contact is rebalanced and the other set of solenoid coils is not balanced until its own associated balancing contact resumes the proper position. It will therefore be evident that our invention provides a novel manner of connecting a plurality of follow-up systems in parallel with a single variable controller and in such a manner that each particular follow-up system must assume the position demanded by the position of the controller. In addition, the system of the present invention includes the highly desirable commercial feature of increasing the contact pressure of that switching mechanism which is operated in a marginal manner rather than an on and off manner. As far as the switching mechanisms 114—115—116 and 145—146—147 are concerned, these are in the nature of on and off apparatus rather than marginal controls so that increasing the contact pressure therebetween is unnecessary. In the event that motor field windings 118 and 119 and 149 and 150 are low voltage windings, then the intermediate relay may be eliminated and the relay windings may become the motor field windings. It should also be noted that the individual follow-up systems utilized in this invention are entirely capable of being controlled by individual controllers so that the follow-up mechanisms of the present invention may be utilized either individually or in a multiple system.

As an example of the values of the various resistances and impedances used in an operable set-up of the system of Fig. 3, the secondary 172 produces 20 volts, the control resistance 101 is 100 ohms, the balancing resistances 129 and 160 are each 135 ohms, the protective resistances 179, 180, 212 and 213 are 35 ohms each, the resistances 186 and 218 are 50 ohms each, the resistances 196 and 228 are each 2400 ohms, the resistances 195 and 227 are each 35 ohms and the impedance of each set of series connected solenoid and relay coils 104 and 105, 111 and 112, 135 and 136, and 142 and 143 is 120 ohms.

It will be evident that a number of changes may be made in the details of the present invention, and particularly the values given above, without departing from the scope of the invention and we are therefore to be limited only in accordance with the appended claims.

We claim:

1. In a temperature control system, in combination, a single variable impedance controller, a pair of electrical follow-up systems concurrently controlled thereby, a temperature controlling device controlled by each of said follow-up systems, and a single source of electrical power connected to said controller and each of said follow-up systems, each follow-up system comprising a pair of normally electrically balanced electromagnetic coils, balancing impedance means therefor, motor means in control of the balancing impedance means, and impedance means associated with the electromagnetic means and balancing impedance means in a manner to cause each motor means to position its temperature controlling device in accordance with the position of said controller, at least one of the coils of each of said systems being connected together and to said controller.

2. In a multiple electrical follow-up system, the combination with a plurality of electrical follow-up mechanisms each comprising a normally electrically balanced relay means, motor means controlled by the relay means, and balancing impedance means controlled by the motor means operative to maintain the relay means electrically balanced, of a single variable impedance controller for unbalancing the energizations of the relays, means electrically connecting the relays of both of said mechanisms together and to said controller, and impedance means associated with both said relay means and both said balancing impedance means to cause each motor means to move to a position corresponding to the condition of said controller in order to effect a rebalancing of the energization of its particular relay means.

3. The combination with a plurality of electrically balanced proportioning control systems each of which comprises relay means normally energized in a certain manner, motor means operated thereby upon a disturbance of such energization and balancing impedance means operated by the motor means to restore such energization, of a single impedance controller, means electrically connecting said relays in parallel to said controller so as to cause the latter to be operable to vary the energization to each of said relay means, and impedance means connected to each of said relay means and its associated balancing impedance means in a manner to prevent restoration of such energization of the relay means until the associated motor means reaches a position corresponding to the condition of said controller whereby all of said control systems are maintained in proper step.

4. In a multiple electrical follow-up system; in combination; a plurality of electrical follow-up systems each comprising a pair of normally equally energized electromagnetic coils, switching means controlled thereby, motor means controlled by the switching means and a balancing potentiometer controlled by the motor means and operative to maintain the energizations of said coils equal; a single control potentiometer connected to each of said pairs of coils and operative to unequalize the energizations thereof, and resistance means associated with each of said pairs of coils and its associated balancing potentiometer operative to permit equalization of the energizations of each pair of coils only when such associated balancing potentiometer has been operated to the position it would have to assume if only one follow-up system were being controlled by said control potentiometer whereby a plurality of such follow-up systems may be operated from a single controller and maintained in proper step.

5. In a multiple electrical follow-up system; in combination; a plurality of electrical follow-up mechanisms each comprising a pair of series connected electromagnetic coils, switching means controlled thereby, motor means, controlled by the switching means and a balancing potentiometer controlled by the motor means and including a balancing resistance and a balancing contact; a single source of power; a single control potentiometer including a control resistance connected across said source of power and a control contact; a plurality of resistances; connections connecting said control contact to the junction of each pair of coils through a separate one of said resistances; connections connecting the junction of each pair of coils to its associated balancing contact; connections connecting each pair of series connected coils across said source of power; and connections connecting each balancing resistance in parallel with its associated series connected coils.

6. In a multiple electrical follow-up system; in combination; a plurality of electrical follow-up mechanisms each comprising a pair of series connected electromagnetic coils, switching means controlled thereby, motor means controlled by the switching means and a balancing potentiometer controlled by the motor means and including a balancing resistance and a balancing contact; a single source of power; a single control potentiometer including a control resistance connected across said source of power and a control contact; a plurality of resistances; connections connecting said control contact to the junction of each pair of coils through a separate one of said resistances; connections connecting the junction of each pair of coils to its associated balancing contact; connections connecting each pair of series connected coils across said source of power; connections connecting each balancing resistance in parallel with its associated series connected coils; and resistance means associated with each pair of coils and its associated balancing potentiometer operative to prevent complete short circuiting of either coil by its balancing potentiometer.

7. In a multiple graduated control system; in combination; a source of power; a plurality of individual follow-up systems each comprising a pair of electromagnetic coils connected in series across said source of power, an open contact switch controlled thereby, motor means controlled by said switch, means including connections and impedance means controlled by said switch for changing the energizations of said coils upon closure of said switch in a manner to increase the pressure of closing of said switch and impedance means controlled by said motor means and operative to equalize the energizations of said coils to cause opening of said switch; a single control impedance connected to each pair of coils and operative to change the energizations of the same; and impedance means associated with each pair of coils and said control impedance operative to keep each follow-up system in proper step with said control impedance.

8. The combination with a plurality of electrically balanced proportioning control systems each of which comprises electrical relay means normally energized in a certain manner, electrical motor means operated thereby upon a disturbance of such energization and balancing resistance means operated by the motor means to restore such energization, of variable control resistance means electrically connected to each of said relay means and operable to vary the energization of each of said relay means, and resistance means connected to each of said relay means and its associated balancing resistance means in a manner to prevent restoration of such energization of the relay means until the associated motor means moves to a position corresponding to the condition of the variable control resistance means whereby all of said control systems are maintained in proper step.

9. The combination with a plurality of electrically balanced proportioning control systems each of which comprises plural coil electromagnetic means, an armature controlled thereby, switching means controlled by the armature, motor means controlled by the switching means, and balancing resistance means connected to at least one of the coils of said electromagnetic means and operated by the motor means in a manner to cause deenergization of the motor means whenever the motor means is energized, of means including control resistance means, and connections between said last-named means and at least one of the coils of each of said electromagnetic means electrically connecting said coils together and to said control resistance means and operable to vary the relative energizations of said electromagnetic means upon variation of said control resistance means to cause operation of said switching means and to prevent deenergization of any of said motor means unless the motor means assumes a position corresponding to the condition of said control resistance means whereby all of said control systems are maintained in proper step.

10. In a temperature control system, in combination, a single variable impedance controller, a pair of electrical follow-up systems connected to and concurrently controlled thereby, a temperature controlling device controlled by each of said follow-up systems and positioned thereby, a single alternating current source of electrical power for said controller and follow-up systems, and impedance means in the connections between said controller and said follow-up systems effective to cause each of said devices to move to the position corresponding to the position of the controller.

11. In a multiple electrical follow-up system, in combination, a plurality of electrical follow-up systems each comprising electrical relay means normally energized in a certain manner, electrical motor means operated thereby upon a disturbance of such energization and balancing impedance means operated by the motor means to restore such energization, variable impedance control means, means connecting the relay means of each of said systems together and to said control means to render said variable impedance control means operable to vary the energization of each of said relay means, and impedance means operative to permit restoration of the original energization of each relay means only when the associated balancing impedance means has been moved to the position it would have to assume if only one follow-up system were being controlled by said control potentiometer whereby a plurality of such follow-up systems may be operated from a single controller and maintained in proper step.

12. In a multiple electrical follow-up system, in combination, a plurality of electrical follow-up systems each comprising electrical relay means normally energized in a certain manner, electrical motor means operated thereby upon a disturbance of such energization and balancing impedance means operated by the motor means to restore such energization, variable impedance control means, means connecting the relay means of each of said systems together and to said control means to render said variable impedance control means operable to vary the energization of each of said relay means and impedance means between said control means and each of said relay means operative to permit restoration of the original energization of each relay means only when the associated balancing impedance means has been moved to the position it would have to assume if only one follow-up system were being controlled by said control potentiometer whereby a plurality of such follow-up systems may be operated from a single controller and maintained in proper step.

13. In a multiple electrical follow-up system, in combination, a plurality of electrical follow-up mechanisms each comprising a pair of series connected electromagnetic coils, motor means controlled in accordance with the energization of said coils, and a balancing potentiometer controlled by the motor means and including a balancing resistance and a balancing contact, a single source of power, a single control potentiometer including a control resistance connected across said source of power and a control contact, a plurality of resistances, connections connecting said control contact to the junction of each pair of coils through a separate one of said resistances, connections connecting the junction of each pair of coils to its associated balancing contact, connections connecting each pair of series connected coils across said source of power and connections connecting each balancing resistance in parallel with its associated series connected coils.

14. In a motor control system, in combination, a single variable impedance controller, a plurality of electrical follow-up systems connected to and concurrently controlled thereby, each of said follow-up systems comprising a motor and a device variably positioned thereby, a single alternating current source of electrical power for said controller and follow-up systems, and impedance means in the connections between said controller and said follow-up systems effective to cause each of said devices to move to the position corresponding to the position of the controller.

LEWIS L. CUNNINGHAM.
CLARENCE W. NESSELL.